United States Patent [19]
Britton et al.

[11] 3,829,229
[45] Aug. 13, 1974

[54] BENDABLE ELASTOMERIC EXPANSION JOINT

[75] Inventors: James E. Britton, Akron; John A. Welch, Cuyahoga Falls, both of Ohio

[73] Assignee: The General Tire & Rubber Company, Akron, Ohio

[22] Filed: Mar. 16, 1973

[21] Appl. No.: 341,834

[52] U.S. Cl. ................................................ 404/69
[51] Int. Cl. ........................................... E01c 11/02
[58] Field of Search ......... 404/69, 68, 67, 47; 14/16

[56] References Cited
UNITED STATES PATENTS

| | | | |
|---|---|---|---|
| 2,400,493 | 5/1946 | Fischer | 404/56 X |
| 3,316,574 | 5/1967 | Pare | 404/47 X |
| 3,375,763 | 4/1968 | Welch | 14/16 X |
| 3,520,236 | 7/1970 | Sequaris | 404/69 |
| 3,650,184 | 3/1972 | Kolm | 404/50 |
| 3,690,226 | 9/1972 | Hein | 404/68 |
| 3,720,474 | 3/1973 | Stog | 14/16 X |

Primary Examiner—Nile C. Byers, Jr.

[57] ABSTRACT

An elastomeric expansion joint is provided which can be bent around corners. An elastomeric body has a main body portion with bearing surface in which a central, preferably planar reinforcing member is at least partially embedded to resist vertical movement of the joint under load, and a pair of opposed longitudinal spacer portions along opposite sides of the main portion in which longitudinal reinforcing members are at least partially embedded. Said longitudinal members, which are preferably "T" or "L" shaped, have through base portions thereof at least one pair of oppositely positioned recesses for bending of the expansion joint.

7 Claims, 6 Drawing Figures

PATENTED AUG 31 1974 3,829,229

BENDABLE ELASTOMERIC EXPANSION JOINT

FIELD OF THE INVENTION

The present invention relates to expansion joints and, more particularly, to reinforced elastomeric expansion joints which can be bent around corners.

BACKGROUND OF THE INVENTION

Bridges, roadways, runways and the like are usually built in sections with gaps between to compensate for material expansion and contraction with changes in temperature. Expansion joints are positioned in the gaps to expand and contract with the adjacent sections while maintaining a substantially smooth transition between sections.

Reinforced elastomeric expansion joints are one form of expansion joint presently in use. Such joints withstand the abuse of heavy automotive traffic and the large dynamic loads of trucks and aircraft as well as provide a water-tight seal between adjacent sections. Reinforced elastomeric expansion joints generally comprise a main elastomeric body in which are totally or partially embedded steel plates or the like. The plates reinforce the joint to resist bending on application of heavy vertical forces and to prevent buckling of the joint on compression. The reinforced elastomeric joint is usually sealed to the adjacent structural sections at shoulders or shelves provided on such sections for that purpose. Illustrative of these elastomeric expansion joints are U.S. Pat. Nos. 3,363,522 and Re. 26,733, both assigned to the assignee of the present invention.

A problem with such reinforced elastomeric expansion joints is that they cannot be readily bent. Thus, while such joints are very useful across the flat portion of a roadway, such joints cannot be easily used in the curb and gutter areas. It becomes necessary to cut the joints into short, prescribed lengths. These specially cut lengths of elastomeric joints are then joined to other specially cut lengths to extend vertically along the face of the curb. This sizing and fitting of the joint sections is not only time-consuming but is relatively expensive. Furthermore, it is quite difficult to achieve adequate sealing using these specially cut lengths.

The present invention provides an elastomeric joint section which overcomes the problem of sizing and fitting joint sections to conform to abrupt changes, such as a curb or the like. It was previously suggested that all or some of the reinforcing members could be removed so that the joint or section might be bent or flexed. However, it is found that indiscriminate removal of the reinforcing members adversely affects the reinforcing characteristics of the expansion joint. Contrary to such prior belief, the present invention provides for removal of certain portions of metal on longitudinal reinforcing plates to provide for the necessary bending of the elastomeric joint while maintaining the reinforcing characteristics of the joint.

SUMMARY OF THE INVENTION

The reinforced elastomeric expansion joint of the present invention comprises an elastomeric body portion having a main body portion with a bearing surface and having a pair of opposed longitudinal spacer portions along opposite sides of the main portion. The spacer portions accommodate, along with the unreinforced parts of the main portion, expansion and contraction of the body and the adjacent roadway sections.

At least partially embedded within the main portion of the body is a central reinforcing plate which extends substantially the length of the joint and is preferably planar in configuration. The central plate functions to resist bending movements caused by vertical loads as well as buckling caused by compression of the joint.

At least partially embedded in each spacer portion are longitudinal reinforcing members to provide strength to the joint at the anchoring areas as well as distribute stresses along the edges of the expansion joint and the sections of the roadway. The longitudinal members preferably are of T-shaped or L-shaped configurations.

Preferably, a pair of spaced apart grooves are provided extending along opposite sides of the main portion of the elastomeric body the length of the joint to accommodate expansion and contraction of the joint. The grooves may be defined by the main portion and longitudinal portions of the spacer portions. Alternatively, the grooves may be defined by the longitudinal reinforcing members with the spacer and main portions of the elastomeric body.

Through the base portions of the longitudinal reinforcing members are at least one pair of recesses. Each such pair of recesses permits a bend of the joint to accommodate a curb, gutter or the like. The recesses are preferably shaped to insure ready, accurate bending of the expansion joint while maintaining adequate strength of the expansion joint at the bend. Preferably, each recess includes a pair of angularly offset or rounded edge portions, possibly with an edge portion parallel to the edge portions of the longitudinal member, to provide for accurate bending of the joint at the recesses. The recesses are preferably formed in the longitudinal members during assembly prior to molding of the elastomeric joint. Thus, during molding, the recesses in the longitudinal members are filled with elastomeric material so as to provide the necessary water-tight seal.

Other features and advantages of the invention will become apparent from a perusal of the following detailed description taken in connection with the accompanying drawings.

DESCRIPTION OF THE PREFERRED EMBODIMENTS

Figure 1:
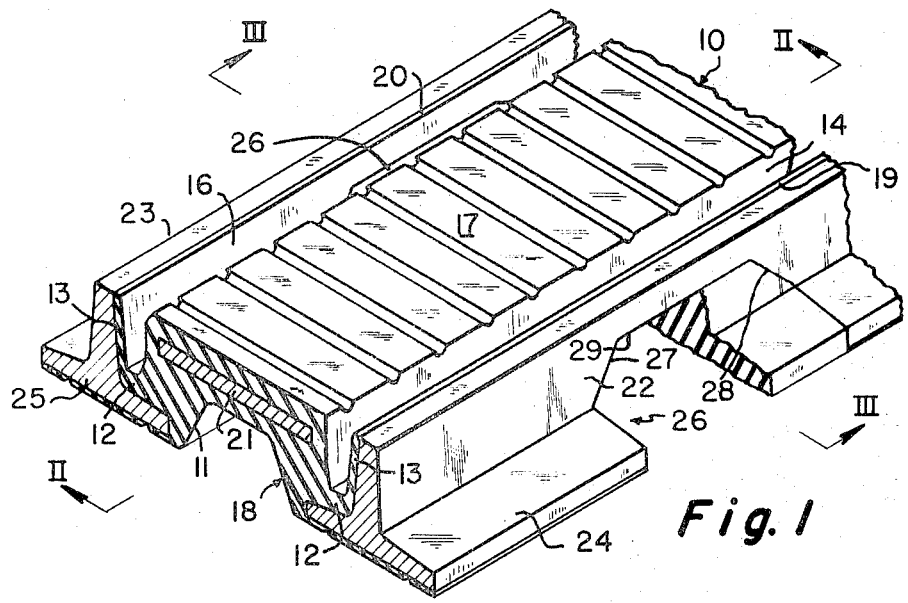
FIG. 1 is a fragmentary isometric view of a reinforced elastomeric joint with the bending recesses partially exposed.

Referring to FIG. 1, a reinforced elastomeric expansion joint is shown comprised of an elastomeric body 10. The particular elastomer used is based upon such factors as cost, weather resistance and the like. Typical elastomers include natural rubbers, neoprene, styrene-butadiene copolymers and the like.

Elastomeric body 10 is comprised of main portion 11 and a pair of opposed longitudinal spacer portions 12. Spacer portions 12 also include longitudinal upright portions 13. Main portion 11, spacer portions 12 and longitudinal portions 13 thereby define a pair of spaced apart longitudinal grooves 14 and 16 extending substantially the length of the joint. Grooves 14 and 16 are adapted to open or close in a direction transverse to the longitudinal axis of the joint to accommodate expansion or contraction of adjacent roadway sections.

Figure 2:
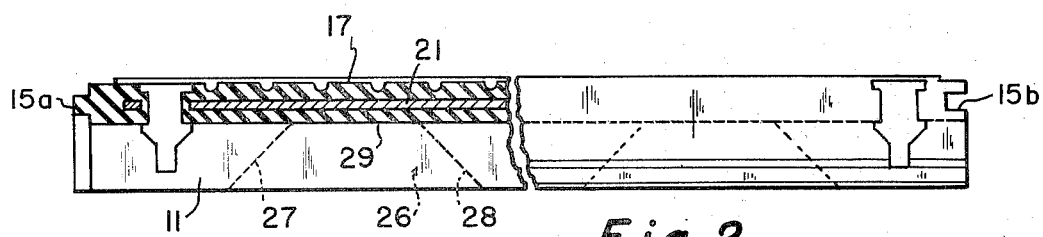
FIG. 2 is an elevational view of a reinforced elastomeric joint of FIG. 1 with a portion in cross-section taken along line II—II of FIG. 1.
Figure 3:
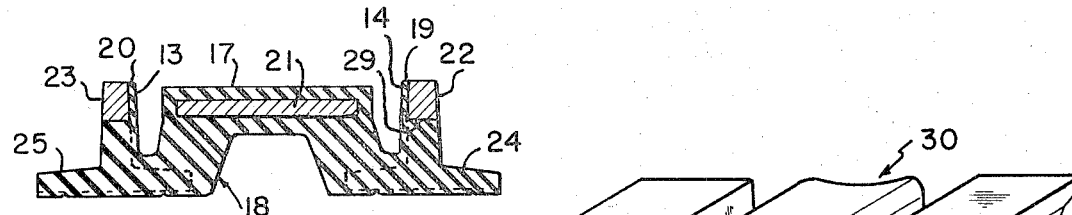
FIG. 3 is a section taken along line III—III of FIG. 1.

Main portion 11 includes bearing surface 17 which is adapted to provide a non-skid, smooth, transitional surface between sections of the roadway which the joint connects. As shown, surface 17 is preferably in the same plane as bearing surfaces 19 and 20 of longitudinal portions 13. Main portion 11, preferably, also includes a groove 18 extending along the longitudinal axis of the expansion joint with its longitudinal open portion facing the base of the joint to accommodate expansion and contraction. Elastomeric joint 10 also preferably includes tongues 15a and grooves 15b as shown in FIG. 2 for interlocking joint sections end-to-end.

Elastomeric joint 10 includes a central reinforcing plate 21 extending substantially the length of joint 10 and, as shown, preferably having planar configuration. Reinforcing plate 21 is either partially or, as shown, wholly embedded within the main portion between bearing surface 17 and groove 18 and lies along the axis of the joint. Plate 21 is preferably of a width greater than the width of the open face of groove 18. Central reinforcing plate 21 is preferably made from a rigid material such as steel.

Positioned along the length of longitudinal portions 13 of spacer portions 12 are longitudinal reinforcing members 22 and 23, respectively. As shown, longitudinal reinforcing members 22 and 23 are provided with an inverted T-shaped cross-sectional configuration. The base portions 24 and 25 of members 22 and 23, respectively, provide for anchoring joint 10 to the adjoining road sections.

Longitudinal reinforcing members 22 and 23 each include at least one recess 26 opposite the recess 26 of the other member. Preferably, recess 26 includes a pair of angularly offset edges 27 and 28, and an edge 29 parallel to the surface of elastomeric joint member 10. Edges 27 and 28 are preferably offset at about a 45° angle with respect to edge 29 and the plane of surface 17. As shown in FIG. 1, longitudinal and spacer portions 12 and 13 embed only a portion of T-members 22 and 23 along grooves 14 and 16, respectively. However, portions 12 and 13 of elastomeric body may completely embed longitudinal reinforcing members 22 and 23, and fill the recesses 26 therein as shown in FIGS. 1 and 2. The thickness of material between the recesses 26 and the surface of joint 10 is typically at least as great as the thickness of plate 21.

Figure 4:
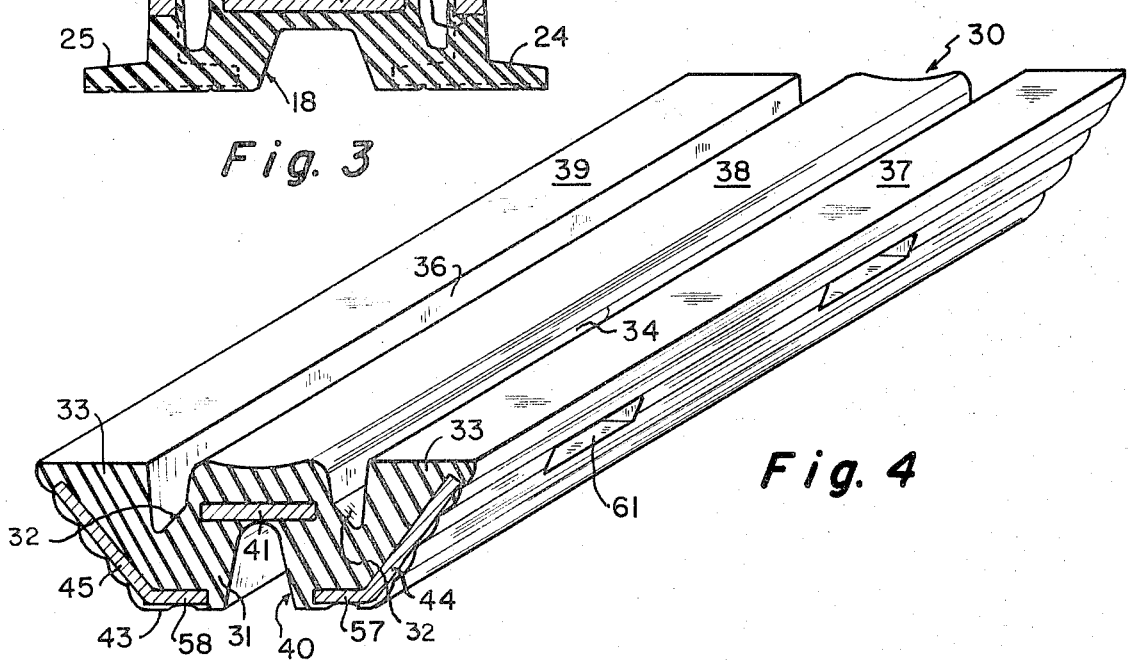
FIG. 4 is a fragmentary isometric view of another reinforced elastomeric joint embodying the present invention.
Figure 5:
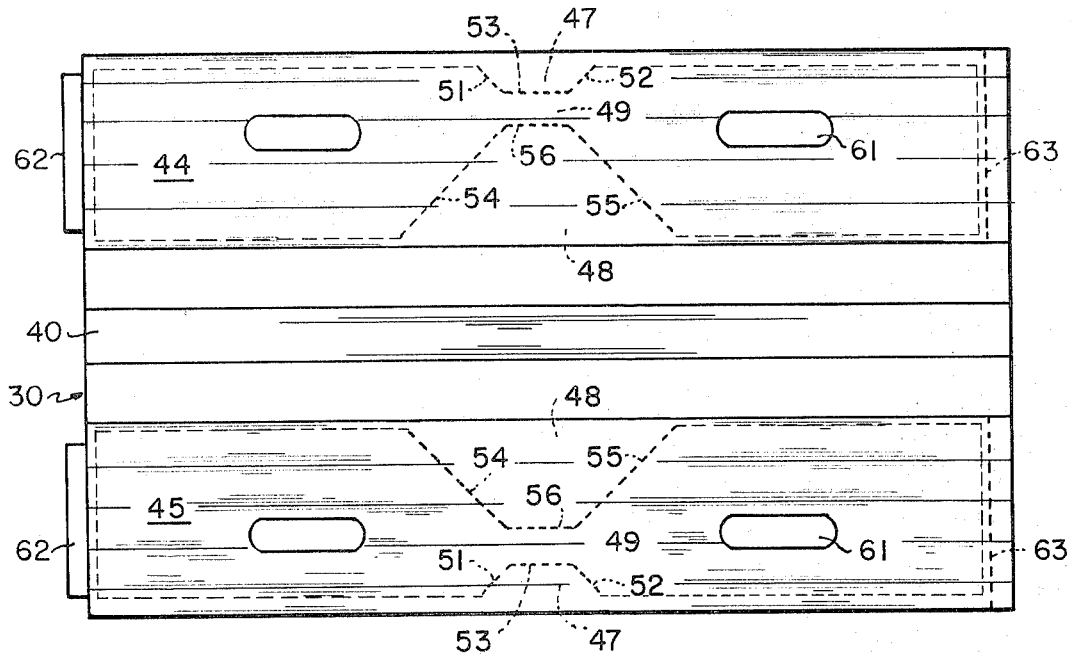
FIG. 5 is a development view from the bottom of said reinforced elastomeric joint of FIG. 4 with the angular sides shown in true projection.
Figure 6:
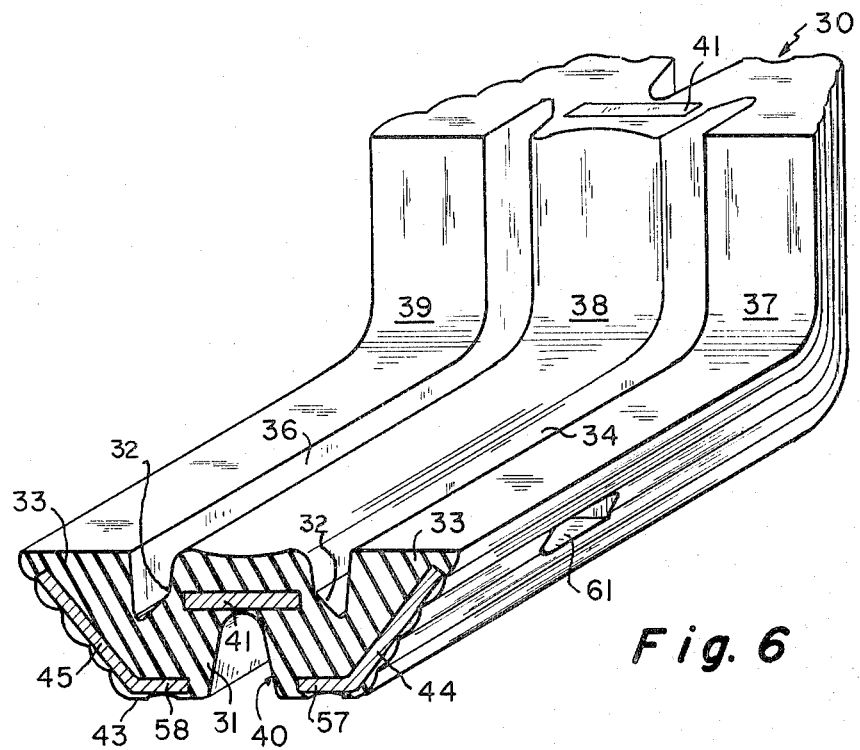
FIG. 6 is a fragmentary isometric view of the joint shown in FIG. 4 bent at a 90° angle.

Referring to FIGS. 4 and 5, an alternative embodiment is shown comprising reinforced elastomeric expansion joint with an elastomeric body 30. Elastomeric body 30 includes a main portion 31 and spacer portions 32 with longitudinal portions 33. Spacer and longitudinal portions 32 and 33 define with main portion 31 spaced apart longitudinal grooves 34 and 36. Main portion 31 and spacer and longitudinal portions 32 and 33 have transitional bearing surfaces 37, 38 and 39 respectively. Bearing surfaces 37, 38 and 39 are preferably of the same width and length and provide a joint surface for transition between road surfaces, that is, of a greater width than base portion 43 of elastomeric body 30. Main portion 31 also includes a central longitudinal groove 40 to aid in expansion and contraction of the joint.

Main portion 31 preferably includes a central reinforcing plate 41 of, as shown, preferably planar configuration. Plate 41 is located between bearing surface 38 and groove 40 and is of a width such that it spans the gap between adjacent roadway sections. Spacer and longitudinal portions 32 and 33 of elastomeric member 30 have entirely embedded therein longitudinal reinforcing members 44 and 45. These members are preferably L-shaped and extend substantially the length of member 30.

As shown in FIG. 5, longitudinal reinforcing plates 44 and 45 each include at least two truncated recesses 47 and 48 inverted with respect to each other. Recess 47 includes a pair of opposing angularly offset edges 51 and 52 and an edge 53 which is parallel to bearing surfaces 37, 38 and 39. Recess 47 opens to the transitional bearing surface of joint 30 and is of a smaller size than recess 48. Preferably, edges 51 and 52 are offset at an angle of about 45° to the surface of the joint.

Recess 48 includes a pair of opposing angularly offset an edges 54 and 55 and edge 56 which is parallel to edge 53 of opening 47. Recess 48 opens to the base portion 43 of joint 30 and extends through the base portions 57 and 58 of longitudinal members 44 and 45.

Longitudinal members 44 and 45 also include openings 61 through which securing means, such as bolts, may pass to secure the section to the roadway. Each joint 30 includes at one end a tongue 62 and a groove 63 for interlocking respective joint sections.

As was described with respect to joint 10, FIG. 1, recesses 47 and 48 are filled with the elastomeric material of longitudinal portions 32 and 33 which may be formed in one (as shown) or two different elastomeric materials and/or one (as shown) or two different molding operations. Also, longitudinal reinforcing members 44 and 45 may be completely embedded within the elastomeric body 30 as shown in FIG. 4, or may be partially exposed as members 22 and 23 as shown in FIG. 1.

Both elastomeric joints of FIGS. 1–3 and 4–6 are of a type commonly referred to as "shear-type" expansion joints. In this type of joint expansion and/or contraction is effected through the shearing action of the main portions of the elastomeric bodies which extend between the longitudinal grooves and the central axial groove.

While presently preferred embodiments of the invention have been shown and described in particularity, the invention may otherwise be embodied within the scope of the appended claims.

What is claimed is:

1. A bendable reinforced elastomeric expansion joint comprising:
   a. an elongated elastomeric body including a main portion having a bearing surface and including a pair of opposed longitudinal spacer portions extending along opposite sides of said main portion;
   b. said main portion and said spacer portions defining a pair of spaced apart upper expansion grooves disposed between said main portion and said spacer portions and extending along the length of said joint;
   c. said main section defining a lower expansion groove disposed between said upper expansion grooves and extending along the length of said joint;
   d. a central longitudinal reinforcing plate at least partially embedded within said main portion opposite said lower expansion groove and extending the length of said joint to resist vertical loading of said main portion;
   e. a respective reinforcing member at least partially embedded in each spacer portion and extending along the length of said joint; and
   f. each said reinforcing member defining a recess through the base portion of said reinforcing member which recess is disposed in opposed relation to the recess defined in the other said reinforcing member.

2. A reinforced elastomeric expansion joint as set forth in claim 1 wherein:
   each of said longitudinal spacer portions has a transitional bearing surface for the joint.

3. An expansion joint as set forth in claim 1 wherein each said recess is defined by two edge portions angularly offset with respect to an edge portion which is disposed parallel to the respective reinforcing member.

4. An expansion joint as set forth in claim 1 wherein said longitudinal reinforcing members have an inverted T-shape configuration and said recesses extend through the base portions of said "T".

5. An expansion joint as set forth in claim 1 wherein said longitudinal reinforcing members have an L-shape configuration.

6. An expansion joint as set forth in claim 1 wherein each said reinforcing member includes two recesses, a first recess which opens to the top of said reinforcing member and a second recess which opens through the base of said reinforcing member, said first and second recesses being spaced apart from each other.

7. An expansion joint as set forth in claim 6 wherein said first and second recesses lie along the same vertical axis of the reinforcing members and said second recess being larger than said first recess.

* * * * *